United States Patent
Mannava et al.

(10) Patent No.: US 8,463,960 B2
(45) Date of Patent: Jun. 11, 2013

(54) SYNCHRONISATION OF DATA PROCESSING SYSTEMS

(75) Inventors: Phanindra Kumar Mannava, Austin, TX (US); Jamshed Jalal, Austin, TX (US); Ramamoorthy Guru Prasadh, Austin, TX (US); Michael Alan Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/137,358

(22) Filed: Aug. 8, 2011

(65) Prior Publication Data
US 2013/0042034 A1 Feb. 14, 2013

(51) Int. Cl.
G06F 3/00 (2006.01)
G06F 5/00 (2006.01)

(52) U.S. Cl.
USPC .............................. 710/61; 710/107; 710/240

(58) Field of Classification Search
None
See application file for complete search history.

(56) References Cited

U.S. PATENT DOCUMENTS

| | | | |
|---|---|---|---|
| 5,365,228 A | 11/1994 | Childs et al. | |
| 6,789,258 B1 | 9/2004 | Zak, Jr. et al. | |
| 7,760,837 B2 * | 7/2010 | Kanazashi | 375/368 |
| 8,006,015 B2 * | 8/2011 | Devilla et al. | 710/240 |
| 8,065,459 B2 * | 11/2011 | Bekooij | 710/244 |
| 8,103,791 B2 * | 1/2012 | Goodman et al. | 709/238 |
| 8,209,493 B2 * | 6/2012 | Rotithor | 711/147 |
| 2004/0017807 A1 * | 1/2004 | Dorr et al. | 370/389 |
| 2008/0301342 A1 * | 12/2008 | Hofmann et al. | 710/105 |
| 2009/0276599 A1 * | 11/2009 | Kulkarni et al. | 711/170 |

FOREIGN PATENT DOCUMENTS

| | | |
|---|---|---|
| CN | 101950282 | 1/2011 |
| JP | 2000-215182 | 8/2000 |

OTHER PUBLICATIONS

UK Search Report dated Oct. 12, 2012 for GB 1210752.0.

* cited by examiner

*Primary Examiner* — Elias Mamo
(74) *Attorney, Agent, or Firm* — Nixon & Vanderhye P.C.

(57) ABSTRACT

A centralised synchronizing device for determining progress of at least a subset of transaction requests that are transmitted through a data processing system. A system synchronizing request is a request generated by one of the plurality of transaction generating devices and queries progress of a subset of the transaction requests. The synchronizing device includes: at least one port to and from the data processing system; a multicast circuitry configured to output a plurality of synchronizing requests for multicast to at least some of the devices within the data processing system where the requests query the progress of the subset of the transaction requests. Gather circuitry collects responses to the requests confirming that the queried progress has occurred at the respective devices. The gather circuitry determines when responses to all of the requests have been received and outputs a response to the system synchronizing request.

18 Claims, 11 Drawing Sheets

SYNCHRONISATION OF DATA PROCESSING SYSTEMS

BACKGROUND OF THE INVENTION

1. Field of the Invention

The field of the invention relates to the field of data processing in systems comprising a plurality of devices connected via an interconnect and in particular, to ways of synchronising different components within such distributed systems.

2. Description of the Prior Art

Distributed systems comprising many devices interconnected by one or more interconnects are known. Transaction requests flowing through these interconnects may take different routes and may be delayed in different ways. There is therefore considerable opportunity for the ordering of the transactions to change. This may or may not be a problem depending on the transactions, but in some cases it can lead to changes in program order that can have unexpected consequences.

Synchronisation of the system at certain points in a transaction request flow is therefore important and transaction request generators may have the ability to generate certain synchronising requests that can be multicast through the system to determine the progress of earlier transactions. When responses to all the multicast synchronising requests have been received the transaction request generator will know that the preceding transactions have reached the required point and that it is safe to issue subsequent transaction requests.

One example of such synchronising requests are barrier requests. These are generated in order to maintain an order of transaction requests with respect to the barrier request. Thus, a transaction request generator may generate a barrier at a certain point in the transaction request stream where it is important that preceding transaction requests have completed or at least reached a required point in the system before subsequent transaction requests are issued. Thus, all pending transaction requests are issued and multiple barrier transactions are generated and sent to follow the transaction requests whose progress is being monitored. When a response to all the multiple barrier transactions are received then the subsequent transaction requests can be issued.

In systems of increasing complexity with increasing numbers of transaction request generators and recipients, the circuitry required to generate and distribute the synchronising requests and to gather their responses in each of the transaction request generators is high. In particular, the transaction generator must know all the destinations that the synchronising requests should be sent to, it must send the barriers and track responses from each destination.

It would be desirable to be able to provide synchronisation of a large distributed system without unduly increasing the hardware of the components of the system.

SUMMARY OF THE INVENTION

A first aspect of the present invention provides a synchronising device for determining progress of at least a subset of transaction requests that are transmitted through a data processing system in response to receipt of one of a plurality of different types of system synchronising requests, said data processing system having a plurality of devices including a plurality of transaction request generating devices for generating said transaction requests and a plurality of recipient devices for receiving said transaction requests, said synchronising device and at least one interconnect for interconnecting at least some of said devices; said system synchronising requests comprising requests generated by one of said plurality of transaction generating devices and querying progress of at least a subset of said transaction requests; said synchronising device comprising: at least one port for receiving requests from, and outputting requests and responses to, said data processing system; system synchronising request identifying circuitry for identifying said type of said system synchronising request received at said at least one port; buffer circuitry for storing received pending system synchronising requests to be output to multicast circuitry; arbitration circuitry for selecting a next one of said pending system synchronising requests for output to said multicast circuitry; said multicast circuitry configured to generate a plurality of synchronising requests in response to receipt of said system synchronising request and to output said plurality of synchronising requests for multicast to at least some of said devices within said data processing system, said synchronising requests querying said progress of said at least subset of said transaction requests at each of said respective at least some of said devices; gather circuitry for collecting responses to said plurality of synchronising requests said responses confirming said queried progress has occurred at said respective device, said gather circuitry being configured to determine when responses to all of said plurality of synchronising requests generated in response to one of said system synchronising requests have been received and in response to determining that all of said responses have been received to output a response to said one of said system synchronising request.

The present invention recognises the problems of increasing hardware and bandwidth requirements of system synchronisation in large distributed systems. It addresses the problem by providing a centralised synchronising device that can respond to a plurality of different system synchronising requests from individual transaction generating devices by generating the required synchronising requests that it then multicasts to the relevant devices. This synchronising device also collects the responses to the synchronising requests that it has multicast and when all responses have been collected it responds to the transaction generating device that issued the system synchronising request.

By centralising the synchronisation, individual transaction generators do not need their own synchronisation circuitry, they simply need to generate a system synchronisation request and transmit it to this particular device and await a response. Thus, the request generating and multicasting circuitry and the response gathering circuitry can be located in this one device which can be used by the many transaction generators. Furthermore, the devices responding to the multicast synchronising requests do not need to identify the source of the system synchronising request and transmit a response to that device, they simply send responses to synchronising requests to the synchronisation device, thereby facilitating the routing of these responses.

Furthermore, by providing arbitration circuitry within the synchronising device, the ordering of the different synchronising requests can be controlled and potential conflicts can be addressed and priorities given in this central device. This avoids the need for the individual transaction generators and recipient devices to control the flow with complicated handshaking mechanisms as occurs in devices of the prior art.

It should be noted that a transaction generating device is any device that generates transactions thus, it may be a master or initiator device in a system, such as a data processor or graphics engine. A recipient device is any device that receives a transaction request, it may not be the final destination of the transaction request, but may be an intermediate device such as a coherency controller or another interconnect.

In some embodiments said arbitration circuitry is configured to select a next one of said pending system synchronising requests for output to said multicast circuitry in dependence upon said type of said system synchronising request and a source of said system synchronising request.

Ordering and prioritisation of the system synchronising requests can be done by the arbitration circuitry in dependence upon the type and source of the requests and stored prioritisation algorithms. Conflicts between system synchronising requests from different sources can be identified and addressed by the arbitration circuitry, without the need for complex flow control in the data processing system.

In some embodiments said synchronising device is configured to execute a plurality of system maintenance requests in addition to said system synchronising requests, said arbitration circuitry being configured to select a next one of said system maintenance requests and said system synchronising requests to output to said multicast circuitry.

In addition to controlling synchronising requests centrally, in some embodiments the synchronising device may also receive and process other system maintenance requests. These are generally requests that do not target memory, and include memory maintenance requests, configuration requests and error handling requests. These requests require handling by similar circuitry to the synchronisation requests in that they are multicast and responses are gathered. Furthermore, some of them may be related to the synchronising requests and thus, it is advantageous if the same device executes these requests as it simplifies the flow control of such requests.

Although the system synchronising request can track the progress of the at least a subset of the transaction request in a number of ways, in some embodiments it requests confirmation that the transaction requests have completed.

Although the subset of transaction requests whose progress is queried can be any subset, in some embodiments it is transaction requests previously output by the transaction request generating device that generated said system synchronising request.

Generally the device that generates the system synchronising requests wishes to know how requests that it generated earlier are proceeding before it issues a later request that may depend on the system wide effects of the earlier request. Thus, often the subset of transaction requests, are at least some of those that have been issued by the device that generated the system synchronising request.

In some embodiments, said system synchronising request requests confirmation that said at least a subset of said transaction requests have been received at their destination devices.

Although in some cases it may be desirable to know if the transaction requests have completed, that is have performed their intended action at the ultimate target. In others it may be sufficient to know they have been received at their destination devices as it may be that this is sufficient for the later transaction request to be issued. This may be the case for example where destination devices do not allow reordering of received transaction requests.

In some embodiments, said synchronising device comprises a data store for storing at least one target list identifying said at least some devices for multicasting said synchronising requests to.

The devices that the synchronising requests are multicast to in response to the system synchronising request can be stored as a list within the synchronising device. This may be a convenient way of centrally storing the information and allowing the multicast of the synchronising requests to appropriate devices. Knowing where the previous transactions to be tracked have been sent and where to therefore multicast the generated synchronising requests can be a complex problem, the storing of lists within the synchronising device that are based on the connections and routing of the system is a convenient way of providing this information to the synchronising device. It also allows for flow control, perhaps only allowing a certain number of system synchronisation requests to be processed at any one time which avoids flooding the targets with synchronisation messages which may have contradictory requirements.

In some embodiments, said data processing system comprises a secure processing domain and a non-secure processing domain, said data store being a secure data store that is not accessible from said non-secure processing domain.

It may be advantageous if the target list of devices is stored securely as in this case, the list may be updated from the secure system as required but cannot be updated in the non-secure domain. This avoids a user accidentally updating these lists which could cause the system to malfunction.

In some embodiments, said data store comprises a plurality of target lists, at least one of said target lists corresponding to at least one of said of said plurality of transaction generating devices, such that in response to receipt of said system synchronising request from one of said plurality of transaction generating devices corresponding to one of said lists said generated synchronising requests are transmitted to said at least some devices in said corresponding target list.

The devices that synchronising requests are sent to will depend on the transaction generating device that generated the system synchronising request. This is because different transaction generating devices may be configured and routed to interact with certain other devices and thus, the synchronising request should only be sent to the devices they interact with. It may therefore be convenient to store a plurality of lists corresponding to these transaction generating devices, the synchronising device being able to select the required list when determining where the system synchronising request comes from.

In some embodiments, said synchronising device is responsive to receipt of an update signal generated in said secure domain to update at least one of said at least one target list.

It may be advantageous if the target list can be updated. Devices that transaction generating devices communicate with may change over time. For example, the routing algorithms of the device may be reprogrammed so that individual devices may be located in different domains and communicate with different devices and/or devices that they communicate with may be powered down. Storing the list centrally makes it convenient and efficient to perform updates when required. In some embodiments, said synchronising device is configured to handle a plurality of different types of system synchronising requests, said data store being configured to store a plurality of target lists, at least one of said target lists corresponding to at least one of said types of said system synchronising requests and to at least one of said of said plurality of transaction generating devices, such that in response to receipt of said system synchronising request of said at least one of said type from said at least one of said plurality of transaction generating devices said generated synchronising requests are transmitted to said at least some devices in said corresponding target list.

Where there are different types of system synchronising requests then the devices that need to receive the multicast synchronising requests may depend on the type of synchronising request and therefore it may be advantageous if there are target lists in the data store that depend on the type of system synchronising request.

In some embodiments, there may be target lists for each transaction generating device and for each type of system synchronising request that the transaction generating device can issue.

In some embodiments, said system synchronising request comprises at least one of a synchronising barrier transaction request, a memory maintenance synchronise request and a finish and suspend processing request.

The system synchronising requests may comprise a number of different requests that query the progress of transaction requests. They may in some cases be synchronising barrier transaction requests and in others memory maintenance synchronising requests while in still others they may be finish and suspend processing requests that may be performed prior to a power down or reconfiguration request.

In some embodiments, in response to said system synchronising request comprising said synchronising barrier transaction request, said multicast circuitry is configured to generate a plurality of barrier transaction requests as said plurality of synchronising requests, said plurality of barrier transaction requests requesting confirmation from said at least some devices that any pending transaction requests issued by said transaction generating device that generated said synchronising barrier transaction request have completed, said responses to said plurality of barrier transaction requests indicating that said pending transaction requests have completed.

If the system synchronising request is a synchronising barrier transaction request then the synchronising device will issue barrier transaction requests as the plurality of synchronising requests. These barrier transaction requests will be sent to the relevant devices and will respond when the preceding at least a subset of transactions that they pertain to have completed. Thus, when responses to all the barrier transactions requests have been received at the synchronising device the synchronising may respond.

In some embodiments, in response to said system synchronising request comprising said memory maintenance synchronise request, said synchronising requests comprise requests querying progress of a plurality of memory maintenance operation requests issued by said transaction generating device, said responses to said plurality of synchronising requests being indicative that said respective devices have completed said memory maintenance operation requests.

Memory maintenance synchronisation requests are also requests that monitor the progress of operations. In this case they query the progress of memory maintenance operations. For example, if the table look aside buffers are being updated in a plurality of devices then a memory maintenance synchronise request can be used to ensure that the update is complete in each of the devices before subsequent transactions that use these tables are issued. In this case the devices being queried will generally be other transaction generator devices that have table look aside buffers relating to the same region of memory.

In some embodiments, in response to said system synchronising request comprising said finish and suspend processing request, said multicast circuitry is configured to generate as said plurality of synchronising requests, requests requesting confirmation that said respective device have completed any pending transaction requests.

Where the synchronising system synchronising request is a finish and suspend processing request then it is important that the transaction requests being executed by the device are known to have completed. In this case both transaction generator devise and recipient devices may be being queried, in such a case there may be ordering requirements and the synchronising device may output the finish and suspend processing request to the transaction generator devices first and only on receipt of responses that they have completed processing will it output the finish and suspend processing requests to the recipient devices.

A second aspect of the present invention provides a transaction generating device comprising: a transaction generator configured to generate a plurality of transaction requests for output to a plurality of devices; a system synchronising request generator configured to generate a system synchronising request querying progress of at least a subset of transaction requests executed by said plurality of devices; an output port for outputting said system synchronising request to a synchronising device; wherein said transaction generator is configured not to output any further transaction requests until a response has been received to said system synchronising request from said synchronising device.

The provision of a central synchronisation device enables transaction generating devices which are generally initiator devices such as processor cores, graphics engines, DMA controllers to query the progress of transaction requests in the data processing system without multicasting synchronising requests themselves but by simply generating a single system synchronising request that is transmitted to the synchronising device and awaiting a response.

A second aspect of the present invention provides transaction generating device comprising: a transaction generator configured to generate a plurality of transaction requests for output to a plurality of devices; a system synchronising request generator configured to generate a plurality of different types of system synchronising requests querying progress of at least a subset of transaction requests executed by said plurality of devices; an output port for outputting said system synchronising requests to a synchronising device; wherein said transaction generator is configured not to output any further transaction requests until a response has been received to said system synchronising request from said synchronising device.

A third aspect of the present invention comprises a data processing system comprising a plurality of devices including a plurality of transaction requests generating devices, at least one of said transaction request generating devices being said transaction request generating device according to a second aspect of the present invention, at least one recipient device for receiving said transaction request, and a synchronising device; said synchronising device comprising: at least one port for receiving said synchronising request from said transaction request generating device; system synchronising request identifying circuitry for identifying said type of said system synchronising request received at said at least one port; buffer circuitry for storing received system synchronising requests to be output to multicast circuitry; arbitration circuitry for selecting a next one of said pending system synchronising requests for output to said multicast circuitry; said multicast circuitry configured to generate a plurality of synchronising requests in response to receipt of said system synchronising request and to output said plurality of synchronising requests for multicast to at least some of said devices within said data processing system, said synchronising requests querying said progress of said at least subset of said transaction requests at each of said respective at least some of said devices; gather circuitry for collecting responses to said plurality of synchronising requests said responses confirming said queried progress has occurred at said respective device, said gather circuitry being configured to determine when responses to all of said plurality of synchronising requests generated in response to one of said system synchronising requests have been received and in response to determining that all of said responses have been received to output a response to said one of said system synchronising request.

In such a system the recipient devices do not need to be involved with flow control, nor do they need to have any prioritisation or arbitration mechanisms to select from co-pending synchronising requests from different generators as the synchronising device will have performed this task.

A fourth aspect of the present invention provides a method of determining progress of at least a subset of transaction requests that are transmitted through a data processing system, said data processing system having a plurality of devices including a plurality of transaction request generating devices, a plurality of recipient devices for receiving said transaction requests, a synchronising device and at least one interconnect for interconnecting at least some of said devices; said method comprising the steps of receiving a plurality system synchronising requests querying progress of at least a subset of said transaction requests received from one of said plurality of transaction request generating devices, at least some of said system synchronising requests being of different types querying progress of different subsets of transaction requests; selecting one of said received pending system synchronising requests for output to said multicast circuitry; receiving said selected pending system synchronising request, generating a plurality of synchronising requests and multicasting said plurality of synchronising requests to at least some of said devices within said data processing system, said synchronising requests querying said progress of said at least subset of said transaction requests at each of said respective devices; collecting responses to said plurality of synchronising requests; determining when responses to all of said plurality of synchronising requests generated from one of said system synchronising requests have been received and in response to determining that all of said responses have been received outputting a response to said one of said system synchronising request.

A fifth aspect of the present invention provides a method of querying progress of transaction requests comprising the steps of generating a plurality of transaction requests for output to a plurality of devices; generating a plurality of system synchronising request querying progress of at least a subset of transaction requests executed by said plurality of devices at least some of said plurality of system synchronising requests being of different types; outputting said system synchronising request to a synchronising device; and not outputting any further transaction requests until a response has been received to said system synchronising request from said synchronising device.

A sixth aspect of the present invention provides a synchronising means for determining the progress of at least a subset of transaction requests that are transmitted through a data processing system in response to receipt of a one of a plurality of different types of system synchronising request, said data processing system having a plurality of device means including a plurality of initiator device means for generating transaction requests and a plurality of recipient device means for receiving said transaction requests, said synchronising means and at least one interconnect means for interconnecting at least some of said device means; said system synchronising request comprising a request generated by one of said plurality of transaction generating devices and querying progress of said at least a subset of said transaction requests; said synchronising means comprising: at least one port means for receiving requests from, and outputting requests and responses to, said data processing system; system synchronising request identifying means for identifying said type of said system synchronising request received at said at least one port; buffer means for storing received pending system synchronising requests to be output to multicast circuitry; arbitration means for selecting a next one of said pending system synchronising requests for output to said multicast circuitry; multicast means for generating a plurality of synchronising requests in response to receipt of said system synchronising request and for outputting said plurality of synchronising requests to multicast to at least some of said device means within said data processing system, said synchronising requests querying said progress of said at least subset of said transaction requests at each of said respective device means; gather means for collecting responses to said plurality of synchronising requests, said responses confirming said queried progress has occurred at said respective device means, said gather means being for determining when responses to all of said plurality of synchronising requests generated in response to one of system synchronising requests have been received and for outputting a response to said one of said system synchronising request in response to determining that all of said responses have been received.

A seventh aspect of the present invention provides an initiator device means comprising: a transaction generator means for generating a plurality of transaction requests for output to a plurality of devices; a system synchronising request generator means for generating a plurality of different types of system synchronising request querying progress of at least a subset of transaction requests executed by said plurality of devices; an output port means for outputting said system synchronising request to a synchronising device; wherein said transaction generator means is configured not to output any further transaction requests until a response has been received to said system synchronising request from said synchronising device.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
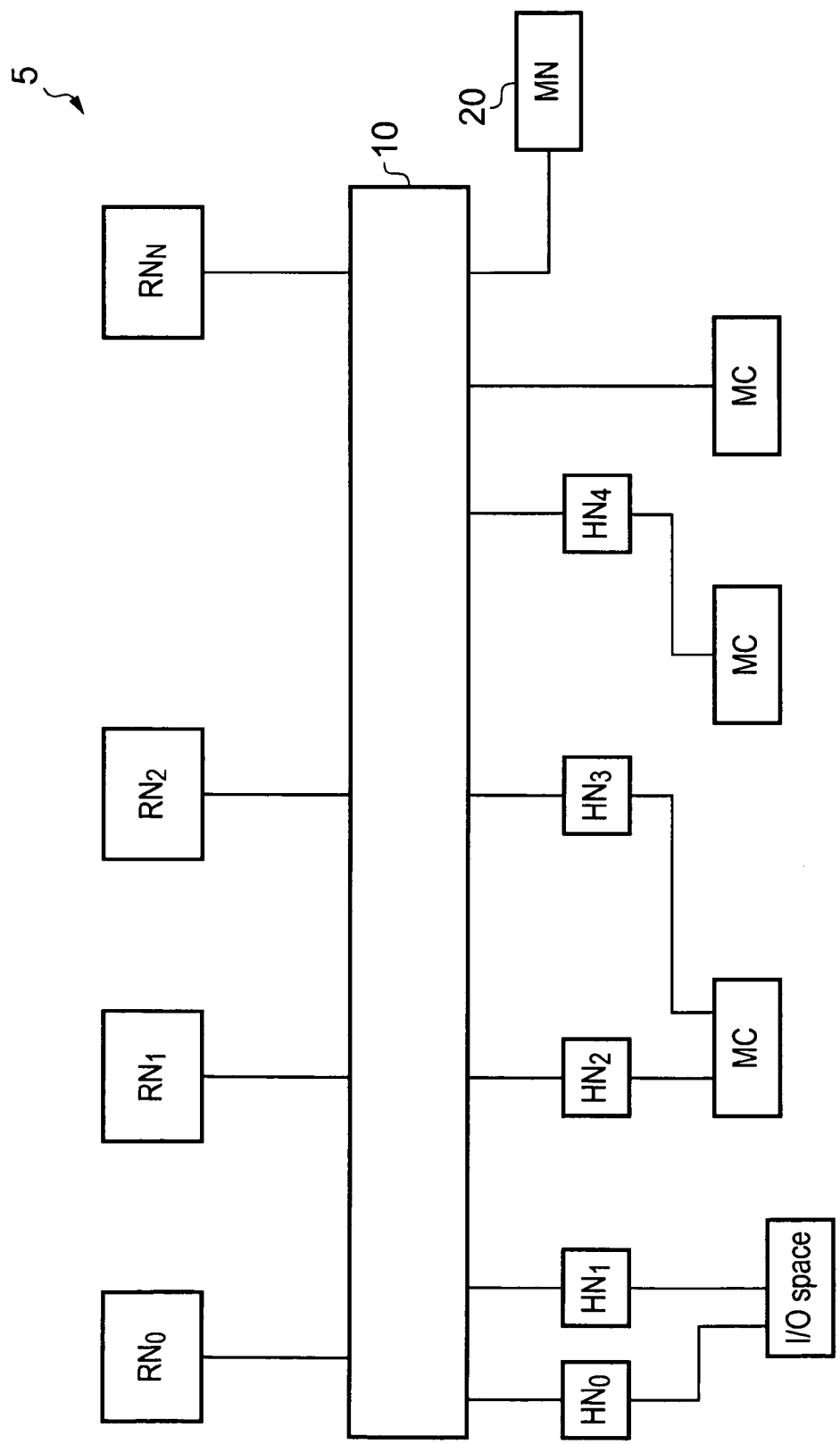
FIG. 1 illustrates a data processing system according to an embodiment of the present invention.

FIG. 1 shows very schematically a data processing system 5 according to an embodiment of the present invention. Data processing system 5 comprises a number of transaction generator devices which can be viewed as request nodes in the system and are shown here as nodes RN0, RN1, RN2 to RNN. These are interconnected via an interconnect 10 with various home nodes HN0, HN1, HN2, HN3 and HN4. These can be viewed as intermediate devices and may be points of coherency or points of serialisation in the system. They may for example be coherency controllers. These home nodes connect with memory controllers for example or with input/output space.

Transaction requests travel through interconnect 10 from the request nodes via the home nodes to the recipient devices. There is some provision for transaction requests to be reordered in the interconnect device 10 and to reach the recipient devices via different routes such that the transactions may overtake each other. This means that synchronising requests to ensure a certain progress of some transaction requests before others are issued become important. In order to address this issue this data processing system comprises a synchronising device 20. This synchronising device is viewed as being at a miscellaneous node MN and is responsive to system synchronising requests generated by one of the request nodes RN to generate synchronising requests and multicast them to the relevant devices. It then collects responses to these synchronising requests from these devices and issues a single response to the request node RN from which it received the system synchronising request when it has collected all the responses. This allows the requesting node RN to generate a single synchronising request and to await a single response. The logic circuitry required for processing these synchronising requests and the responses being centralised within synchronising device 20.

Figure 2:
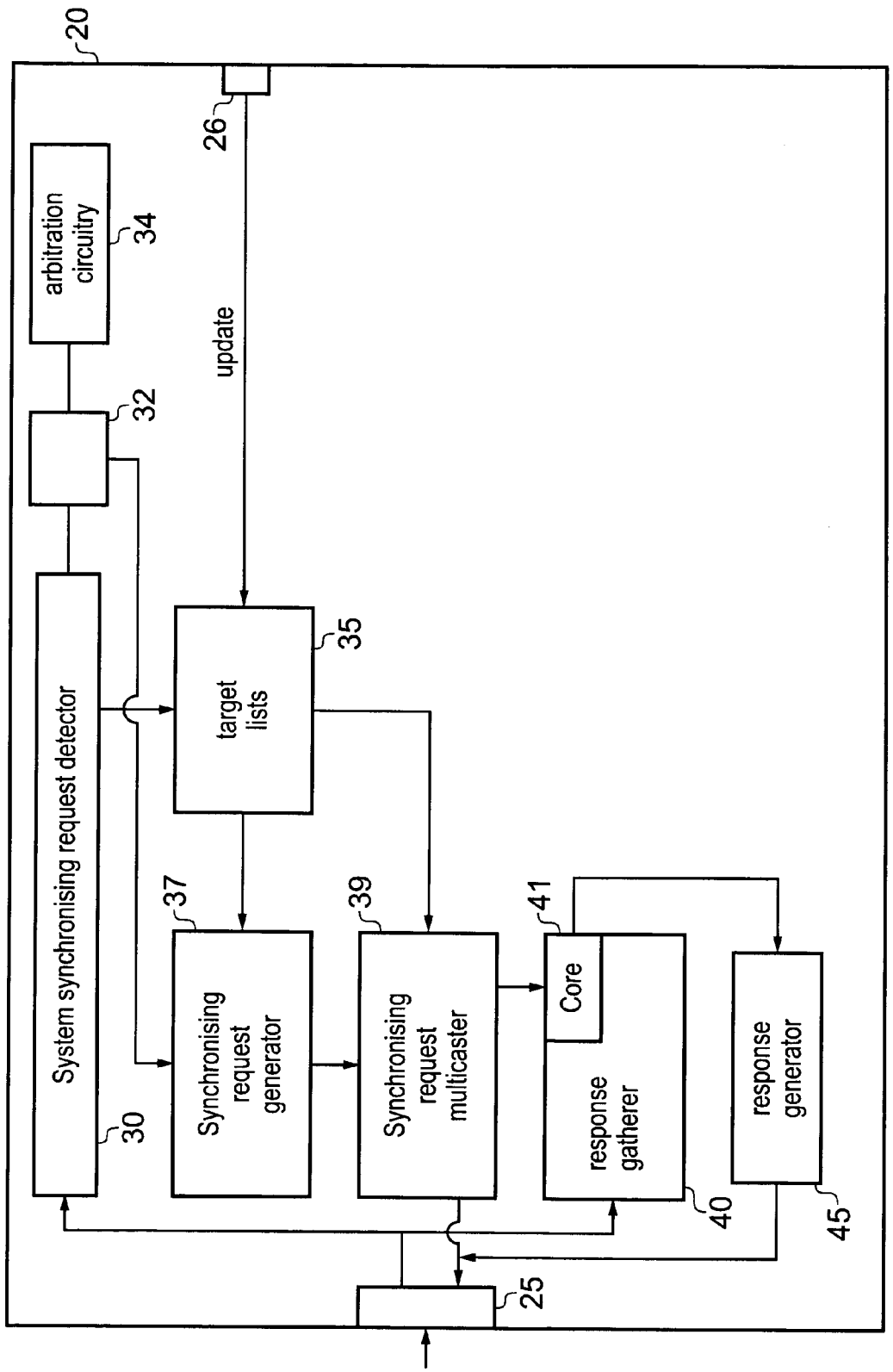
FIG. 2 illustrates a synchronising device according to an embodiment of the present invention.

FIG. 2 shows in more detail synchronising device 20. Thus, in this embodiment synchronising device 20 has a system synchronising request detector 30 that detects system synchronising requests received at input port 25 that have been issued by one of the transaction generator devices of the system. These received pending system synchronising requests are stored in buffer 32 prior to output to the synchronising request generator 37. Arbitration circuitry 34 identifies the type of system synchronising request received and the transaction generator that sent it and selects a system synchronising request to output to the generator 37 when the synchronising device 20 has capacity to process a next system synchronising request. In embodiments of the invention several system synchronising requests can be processed at any one time and when one completes a response is generated and output to the arbitration circuitry 34 which then selects a next one. In this example only one is processed at any one time.

The arbitration circuitry 34 identifies potential conflicts, perhaps between synchronising requests from different transaction generators, and also determines a priority of any pending system synchronising requests and selects a system synchronising request to output.

When outputting a system synchronising request to synchronising generator 37, the synchronising device 20 will access the target list within data store 35 that corresponds to the type of system synchronising request to be output and the transaction generating device that sent it. It will then generate a plurality of synchronising requests using synchronising request generator 37 sufficient to be sent to each of the devices listed in the identified target list. Synchronising request multicaster 39 will then issue the generated synchronising requests to the devices listed in the target list. The counter 41 within response gatherer 40 will be updated with the number of synchronising requests that are issued by synchronising request multicaster 39.

Synchronising device 20 will then await responses to these individual synchronising requests and response gatherer 40 will receive these responses and decrement counter 41 for each received response. When counter 41 reaches zero response generator 45 will generate a response to the system synchronising request and will transmit this to the transaction generating device that sent the system synchronising request. The transaction generating device therefore simply needs to generate a single system synchronising request and await a response to it. It does not need to have any of the multicasting or response gathering circuitry that would be required if it were managing the synchronising itself. When a response has been issued processing of the system synchronising request has completed and pending system synchronising request can be selected by arbitration circuitry 34.

In this embodiment there is an input port 25 for receiving the requests and responses and for outputting requests and responses and there is a further port 26 that receives an update signal from the processing system. This update signal can update the target list of devices that synchronising requests should be sent to. Being able to update the target lists may be important as the devices that transaction requests are sent to and that synchronising requests therefore need to go to may change, when portions of the system are powered down, or where some reconfiguration of the domains of the devices and their interconnections occurs.

It may be advantageous in certain embodiments if the data store storing the target list is a secure data store such that it can only be updated from a process operating in the secure domain. This will prevent a user accidentally updating this target list and make sure that it is only updated by the system.

Figure 3:
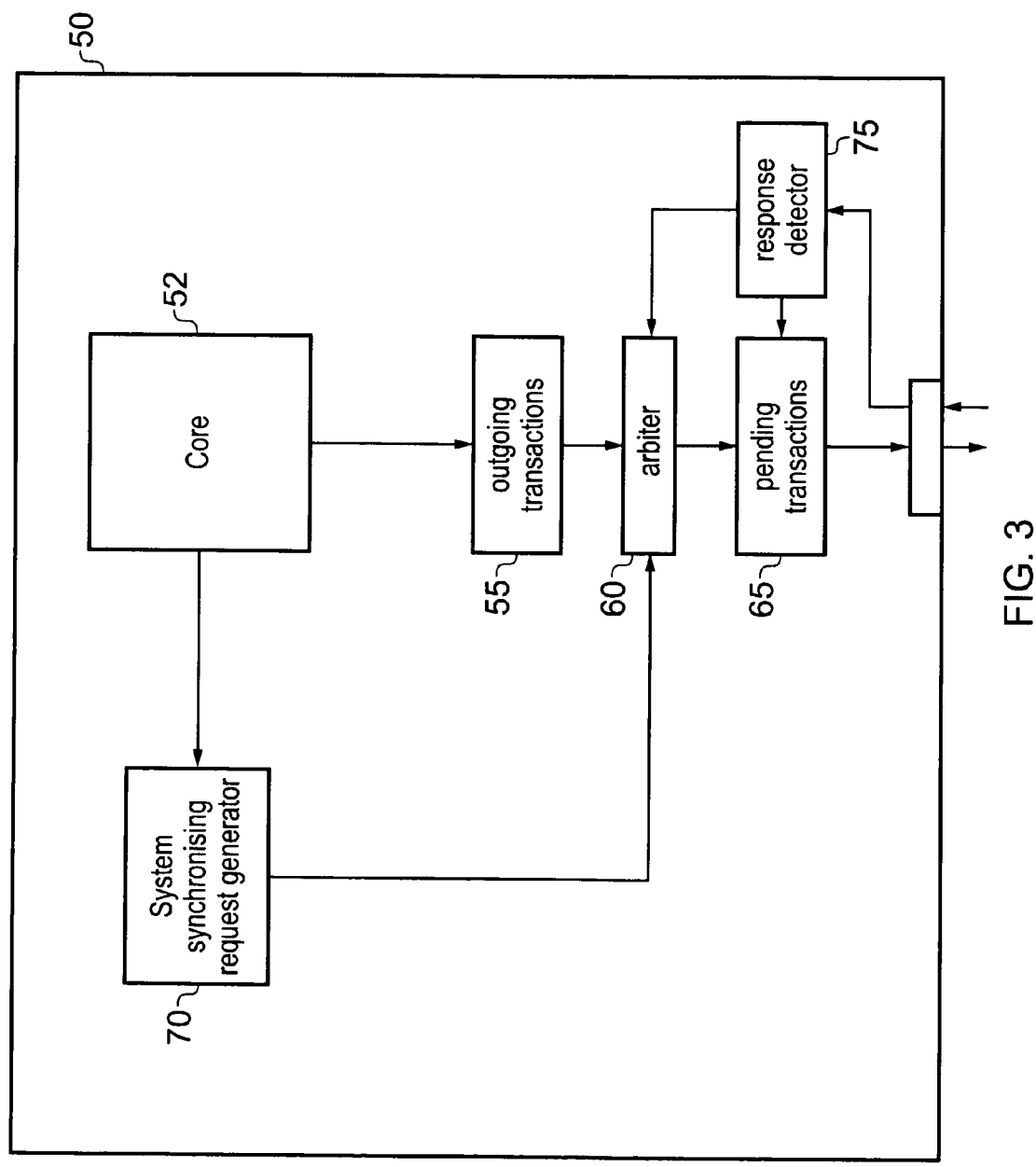
FIG. 3 illustrates a transaction request generator device according to an embodiment of the present invention.

FIG. 3 shows an example of a transaction generating device 50 according to an embodiment of the present invention. Transaction generating device 50 is in this embodiment a processing apparatus. It comprises a processing core 52 that generates transactions and these are stored in outgoing transaction buffer 55. Arbiter 60 selects these outgoing transactions to issue and the pending transaction are stored in pending transaction buffer 65 awaiting response indicating that they have been accepted or completed by their destination device.

There is also a system synchronising request generator 70 that generates system synchronising requests at certain points in the transaction request flow where it is important that previous transaction requests complete before subsequent transaction requests are issued. In response to such a system synchronising request being generated arbiter 60 will issue all outgoing transactions in buffer 55 and then when they have completed it will issue the system synchronising request and no further transactions will be issued until a response is detected from response detector 75. When a response has been detected to the system synchronising request then arbiter 60 will allow further transactions to be output.

Figure 4:
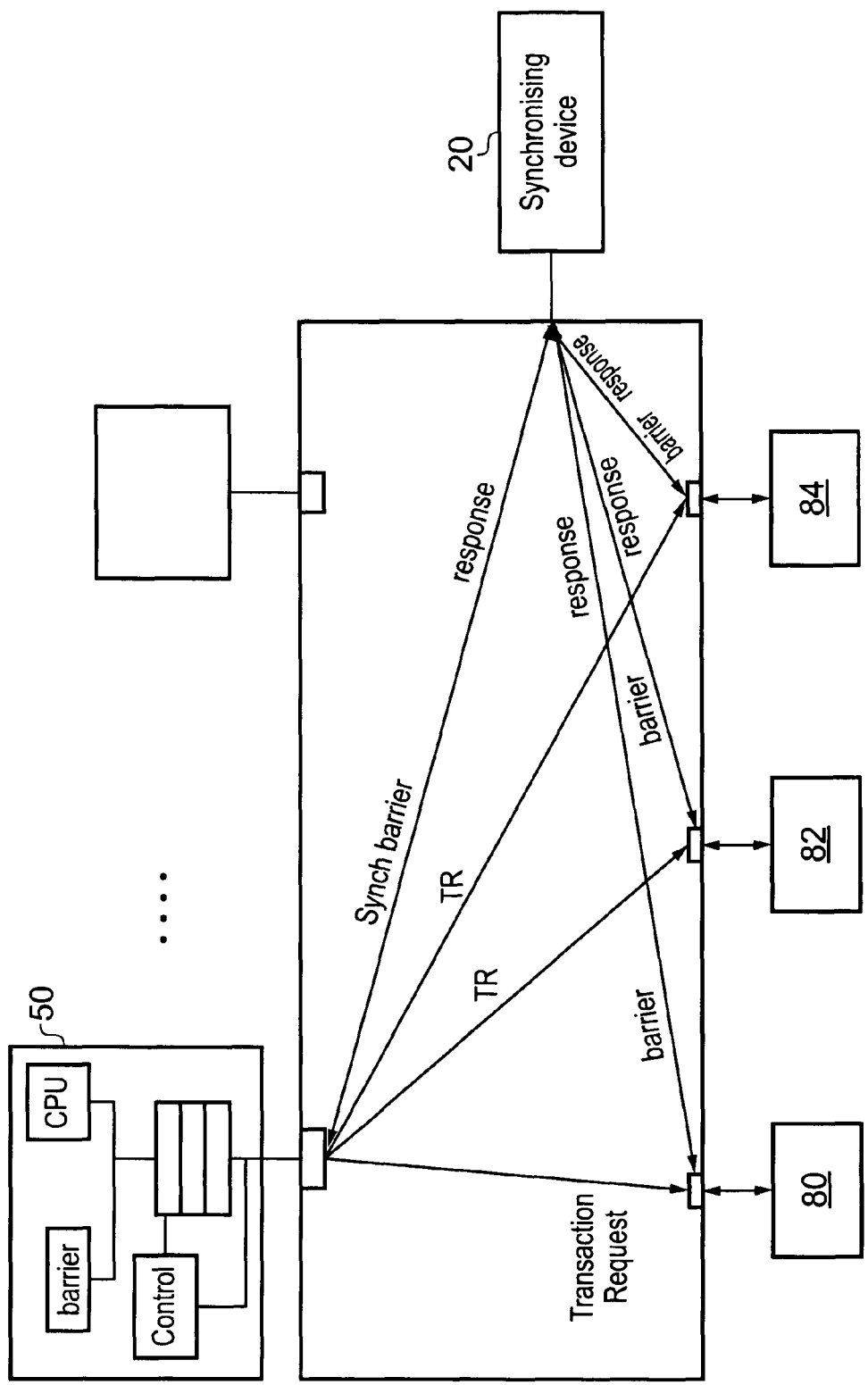
FIG. 4 illustrates synchronising requests flowing through a data processing system according to an embodiment of the present invention.

FIG. 4 shows an example of a data processing system showing a transaction request flow. Thus, transaction request generator 50 will generate a variety of transaction requests which will be received by various recipient devices 80, 82 and 84. The transaction generator 50 will then issue a system synchronising barrier request to synchronising device 20 and will issue no further transaction requests until it has received a response from the system synchronising barrier.

Synchronising device 20 determines that transaction generator 50 communicates with recipients 80, 82 and 84 from a stored target list and therefore it generates barriers and multicasts them to each of these devices. When each of the devices has responded to the barrier then synchronising device 20 responds to the system synchronising barrier received from transaction generator 50 whereupon transaction generator 50 will continue to issue transaction requests.

Figure 5:
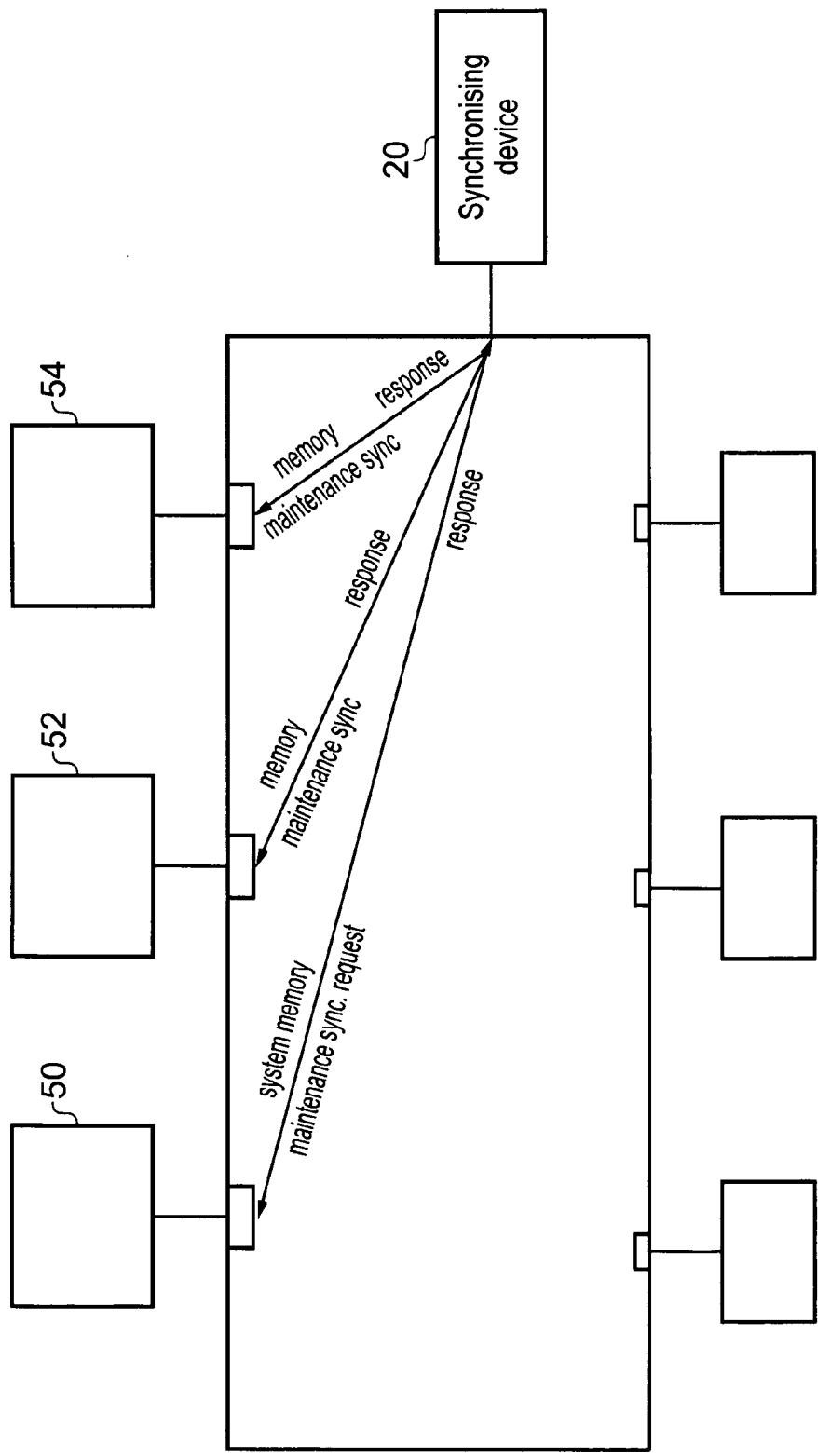
FIG. 5 illustrates a flow of memory maintenance synchronising requests through a data processing system according to an embodiment of the present invention.

FIG. 5 shows an alternative example of the transaction flow in a data processing system according to an embodiment of the present invention when transaction generator 50 generates a system memory maintenance synchronisation request to synchronising device 20. This request is requesting the progress of memory maintenance operations. Thus, synchronising device 20 determines from a target list which transaction generators will have received the memory maintenance operations and it transmits memory maintenance synchronising request to each of these. In this example these are transaction generators 52 and 54. When responses from each of these has been received the synchronising device 20 responds to the system memory maintenance synchronising request and transaction generator 50 then knows that all the memory maintenance operations have been performed by devices 52 and 54 and it can continue to issue transaction requests.

Figure 6A:
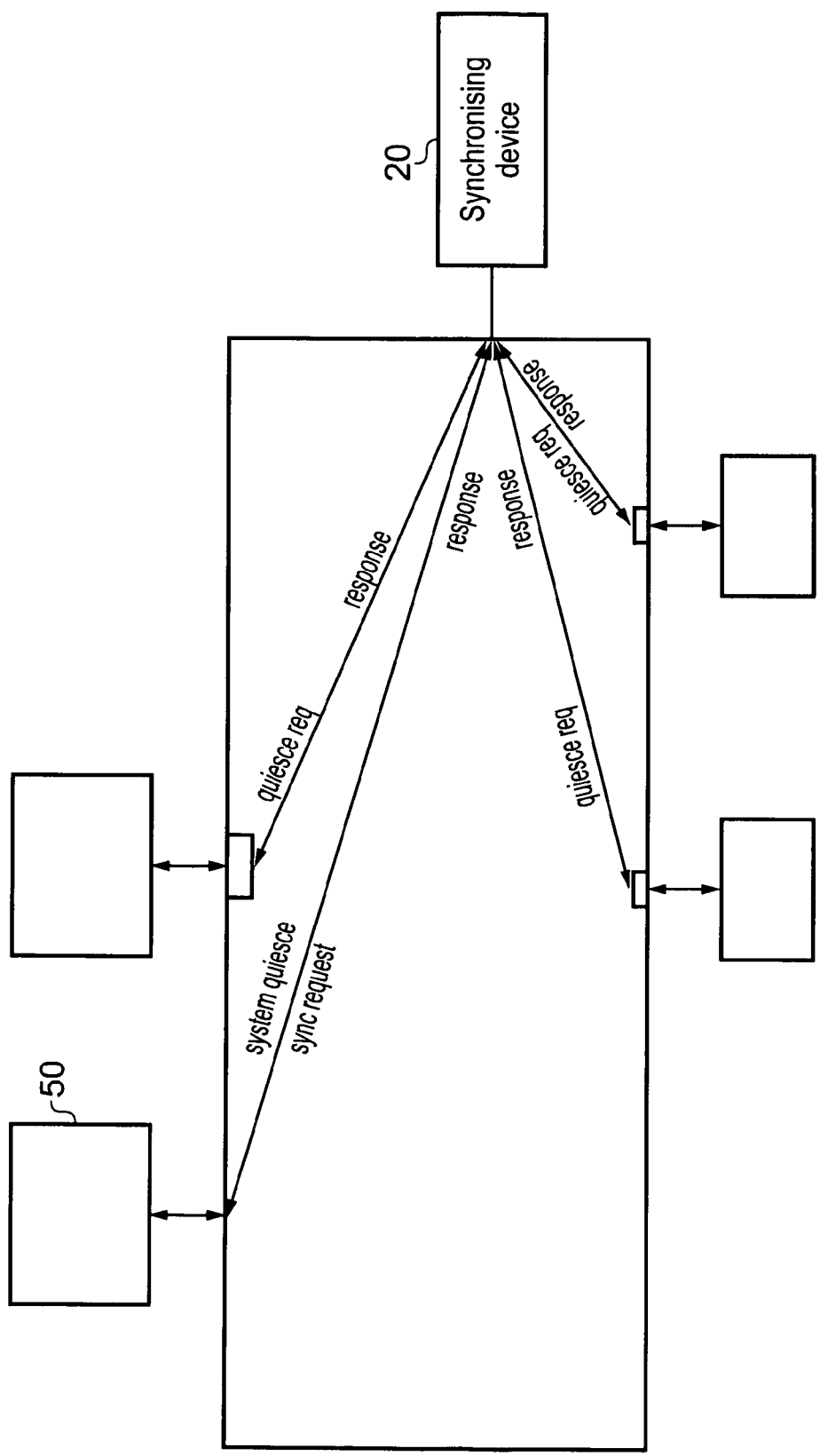
FIG. 6a illustrates quiesce synchronisation requests flowing through a data processing system according to an embodiment of the present invention.

FIG. 6a shows schematically the flow of quiesce requests in a data processing system according to an embodiment of the present invention. A quiesce request is a request to query when devices have finished executing pending transaction requests and to impede them from outputting further transaction requests.

In this example initiator device 50 issues a system quiesce synchronising request and synchronising device 20 generates quiesce synchronising requests in response to this and multicasts these requests to various devices in the system. These devices may have interdependencies and therefore, there may be some timing constraints associated with the quiesce requests that are sent by synchronising device 20. This will be shown in more detail with respect to FIG. 6b. As can be seen from FIG. 6a both recipient and initiator devices can receive these quiesce requests and thus, synchronising device 20 looks at the appropriate target lists and sends the quiesce request to the appropriate devices in the appropriate ordering. It then awaits responses and when it has received responses from all of them it sends a response to the device 50 such that it knows that the devices have finished processing pending transaction requests and will not issue further ones. It can then send out a request that required this knowledge such as a power down request or a reconfiguration request.

Figure 6B:
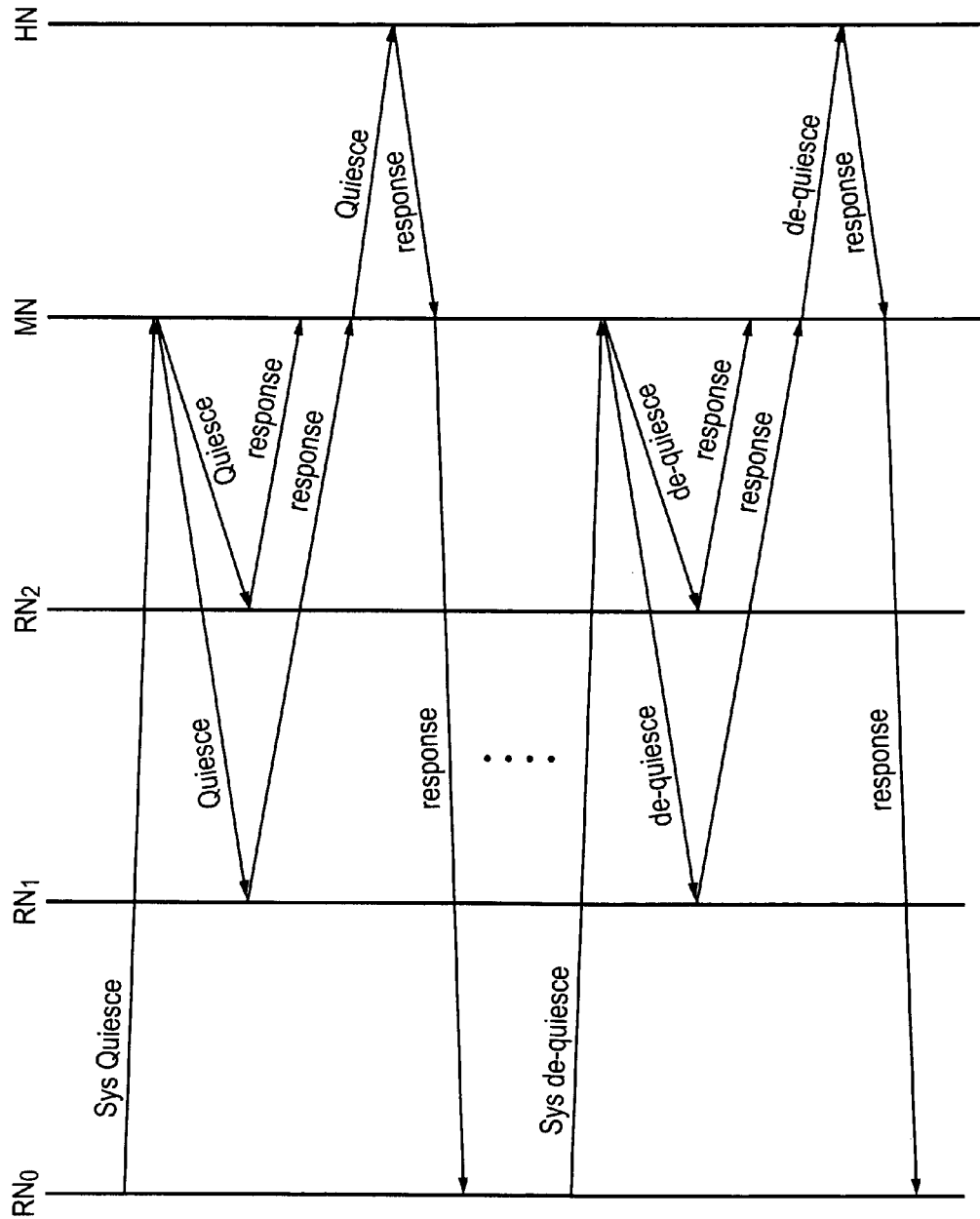
FIG. 6b illustrates a state space flow diagram illustrating the flow of transaction requests in response to a quiesce and dequiesce syncrhonisatoin request.

FIG. 6b shows a state space flow diagram illustrating steps that occur when a system is quiesced. Thus, a system synchronising quiesce request may be issued by RN0 to the synchronising device at MN. MN will then issue quiesce request to RN1 and RN2 and will await their responses. When it receives their responses it will issue a quiesce to FIN and wait for a response from HN. It does it in this order as RN1 and RN2 may issue transaction requests to the home node FIN which may for example be a coherency controller. Thus, if the home node HN were to receive a quiesce request at a same time as the requestor nodes and finish its pending transactions and respond quickly, it may later receive transaction request from the one of RN1 or RN2 that are completing their transaction requests and it would not be able to process this. Thus, to ensure that the system operates correctly the transaction generators are quiesced and respond to the synchronising device before the recipient devices receive their quiesce requests. It should be understood here that more complex flow control could be used as appropriate with the MN selecting different combinations of requesters to be quiesced first followed by others as appropriate.

Once a response has been received from all the devices then a response is sent to RN0 to tell it that all the required devices have quiesced. Quiesce requests may be used during power down for example or it the routing tables for the interconnect are being updated. If one wishes to change the routing tables then transaction requests should not be issued while this occurs. Thus, all pending transaction requests must be complete and the devices are therefore quiesced so that they issue no further transaction requests. The routing table are then re-programmed and the corresponding target lists in synchronising device 20 updated. If a system quiesce request is sent because a portion of the data processing system is powered down then the target list may also be updated in synchronising device 20.

Once the low power mode has finished or the routing tables have been re-programmed then the system can be de-quiesced and a system de-quiesce demand is sent. This is received at the synchronising device MN and it can send its de-quiesce signals to all appropriate devices at the same time. There is no timing requirement here so they can all be sent together. Once responses have been received from them all a response is sent to the transaction request generator RN0 which can then continue to operate in the normal matter.

Figure 7:
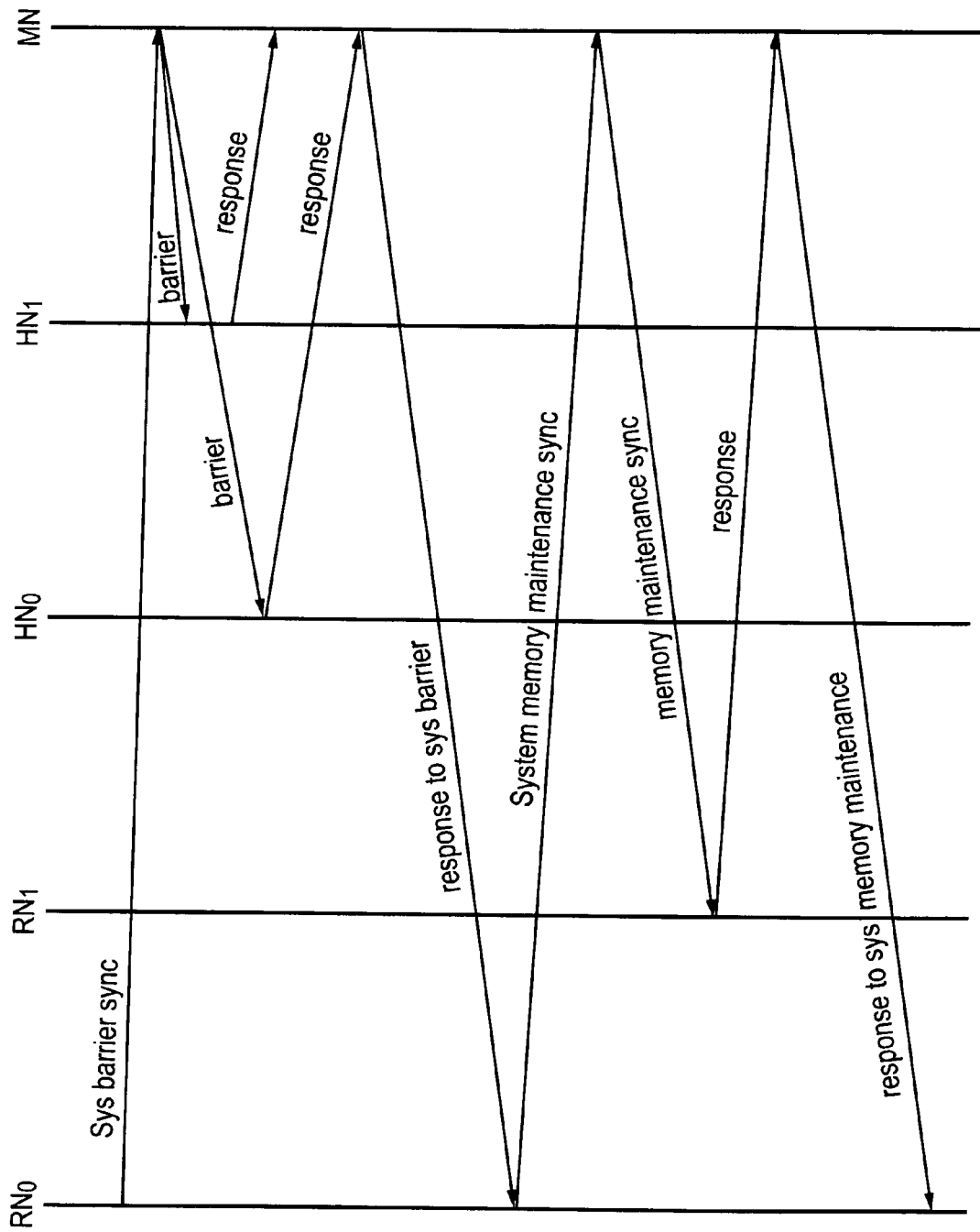
FIG. 7 illustrates a state space flow diagram illustrating the transaction flow between nodes in response to memory maintenance synchronising requests in a data processing system according to an embodiment of the present invention.

FIG. 7 shows a state space flow diagram illustrating the timing of transaction requests. This represents system synchronising requests that are sent after memory maintenance operation requests. For example, there may be memory maintenance units that use particular translation look aside buffers to translate virtual addresses of instructions sent by processors to physical addresses that are used by the data stored within the processing system. Memory maintenance operations may update these translation tables and when subsequent instructions use a new translation it is important to know that all translation look aside buffers accessing the same memory space are also updated. Thus, to ensure this occurs synchronising requests are required.

In such a case a system barrier synchronising request may be sent to ensure that all pending transaction requests have completed. Thus, in response to this the synchronising device at the miscellaneous node MN will generate and transmit barriers to the relevant recipients HN0 and HN1 in this example. Responses to these barriers will be sent from HN0 and HN1 and once all responses have been received the synchronising device at MN will respond to the system barrier synchronisation request.

When RN0 receives this response it knows that pending transaction requests have completed but it does not know that any memory maintenance operations sent whose requests were sent prior to receipt of the barrier response (and are not shown here) have completed. These memory maintenance operations may be being performed by transaction generator devices while the transaction requests are being executed by the recipient devices. Thus, the transaction generator will then transmit a system memory maintenance synchronisation request to the synchronising device at the miscellaneous node MN. This device will then issue memory maintenance synchronising requests to all transaction generator devices that have table look aside buffers that access the same memory space as the device generating the memory maintenance synchronising request RN0. In this case this will be RN1. When a response to this synchronising request is received at the synchronising device it knows that all memory maintenance operations have been performed and in this case the table look aside buffers are consistent and a response to the system memory maintenance request can be sent and the transaction generator RN0 can issue further transaction requests.

In the state space diagram of FIG. 7, the memory maintenance operation requests are not shown. These may be output by RN0 and when a response to all of them have been received the memory maintenance synchronising request will be output. However, in some embodiments these memory maintenance operation requests may also be managed by the synchronising device rather than the transaction generator itself. In such a case RN0 will output a system memory maintenance request requesting a sequence of these operations to be performed to the synchronising device, which will generate multiple ones of these requests and output them to the required device determined from a target list. In such a case the output and ordering of the sequence of memory maintenance requests will be controlled by the synchronising device at MN and in response to them all having been received a response will be sent to RN0 whereupon RN0 will issue the system memory maintenance synchronising request which will query when all of the maintenance operations have been completed.

Figure 8:
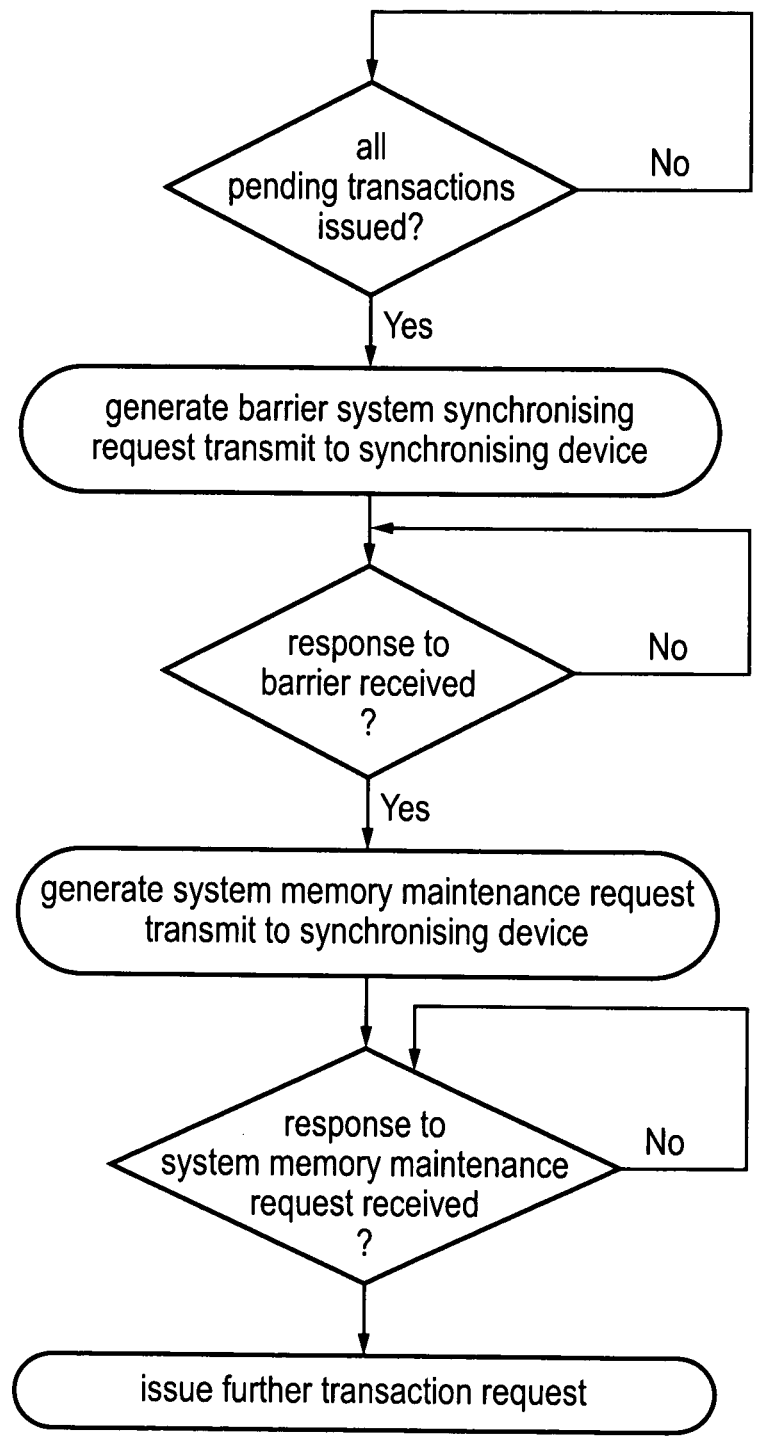
FIG. 8 illustrates a flow diagram illustrating steps in a method performed at a transaction generating device according to an embodiment of the present invention.

The method steps performed at the transaction generator RN0 in the state space flow diagram shown in FIG. 7 are illustrated in FIG. 8. Initially the transaction generator determines that all pending transactions have been issued. When they have a barrier system synchronising request is generated and transmitted to a synchronising device.

A response to this barrier is awaited and when one has been received the transaction generator device generates a system memory maintenance request and transmits this to the synchronising device.

It will then await a response to the system memory maintenance request and when this has been received it knows that the memory maintenance operations and all preceding transaction requests and complete and it can issue further transaction requests.

Figure 9:
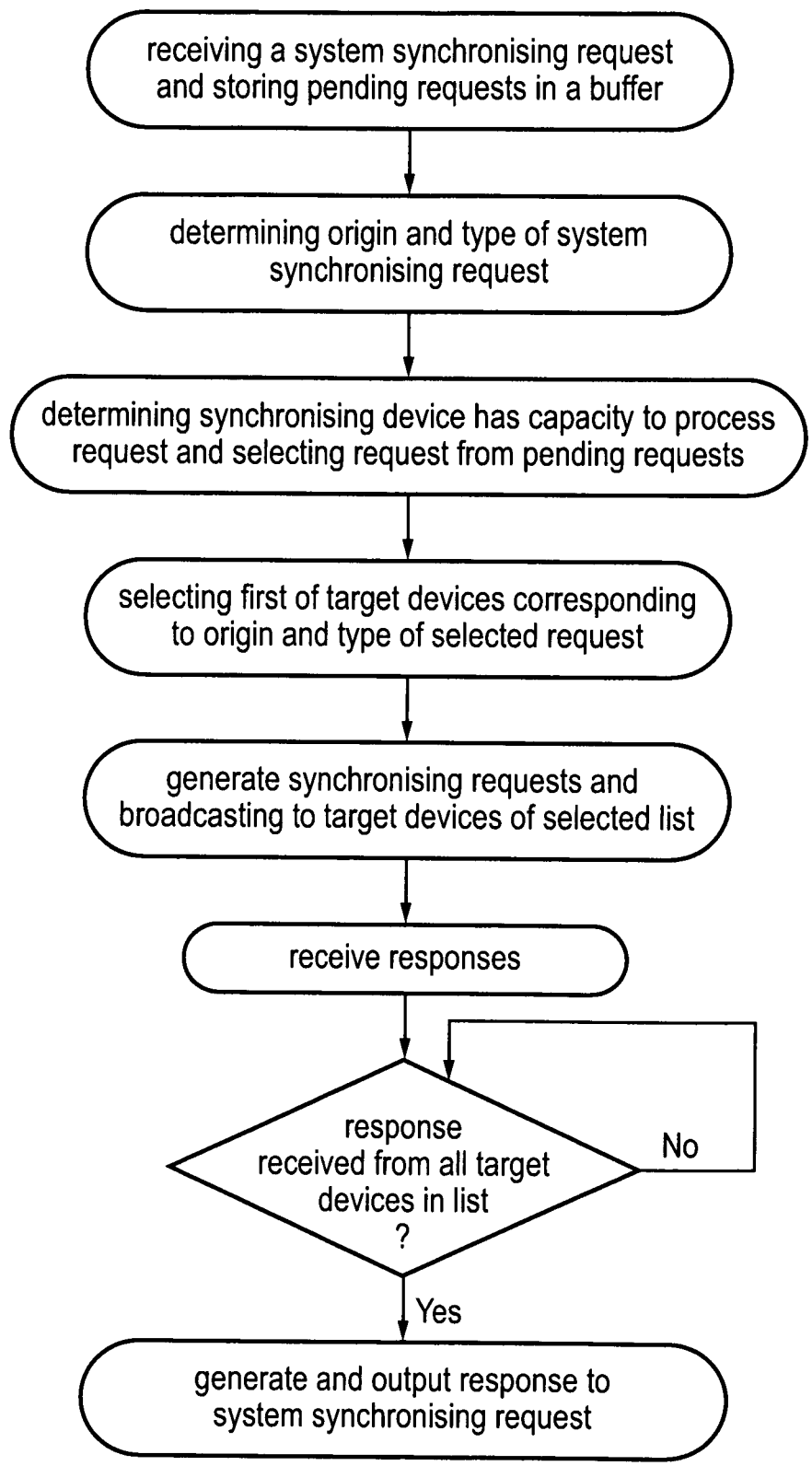
FIG. 9 illustrates steps in a method performed by a synchronising device according to an embodiment of the present invention.

FIG. 9 shows a flow diagram of a method that is performed at a synchronising device according to an embodiment of the present invention. In response to receiving a system synchronising request the synchronising device it is stored in a buffer and its origin and type is determined. When the synchronising device has capacity to process a next synchronising request one of the pending synchronising requests is selected by arbitration circuitry in dependence upon its origin type and the other requests that are currently being processed. It will then select a list of target devices that correspond to this origin and type. The origin of the synchronising request is the particular transaction generator device that generated it, while the type is the type of synchronising that is to be performed.

The synchronising device will then generate synchronising requests for the target devices of the selected list and will multicast these synchronising requests to these target devices.

It will then receive responses from the synchronising requests and will determine when responses from all of the target devices in the list have been received. It may do this using a counter that it set with the number of synchronising requests output and decremented each time a response is received.

When all responses have been received it will generate and output a response to the system synchronising request.

Figure 10:
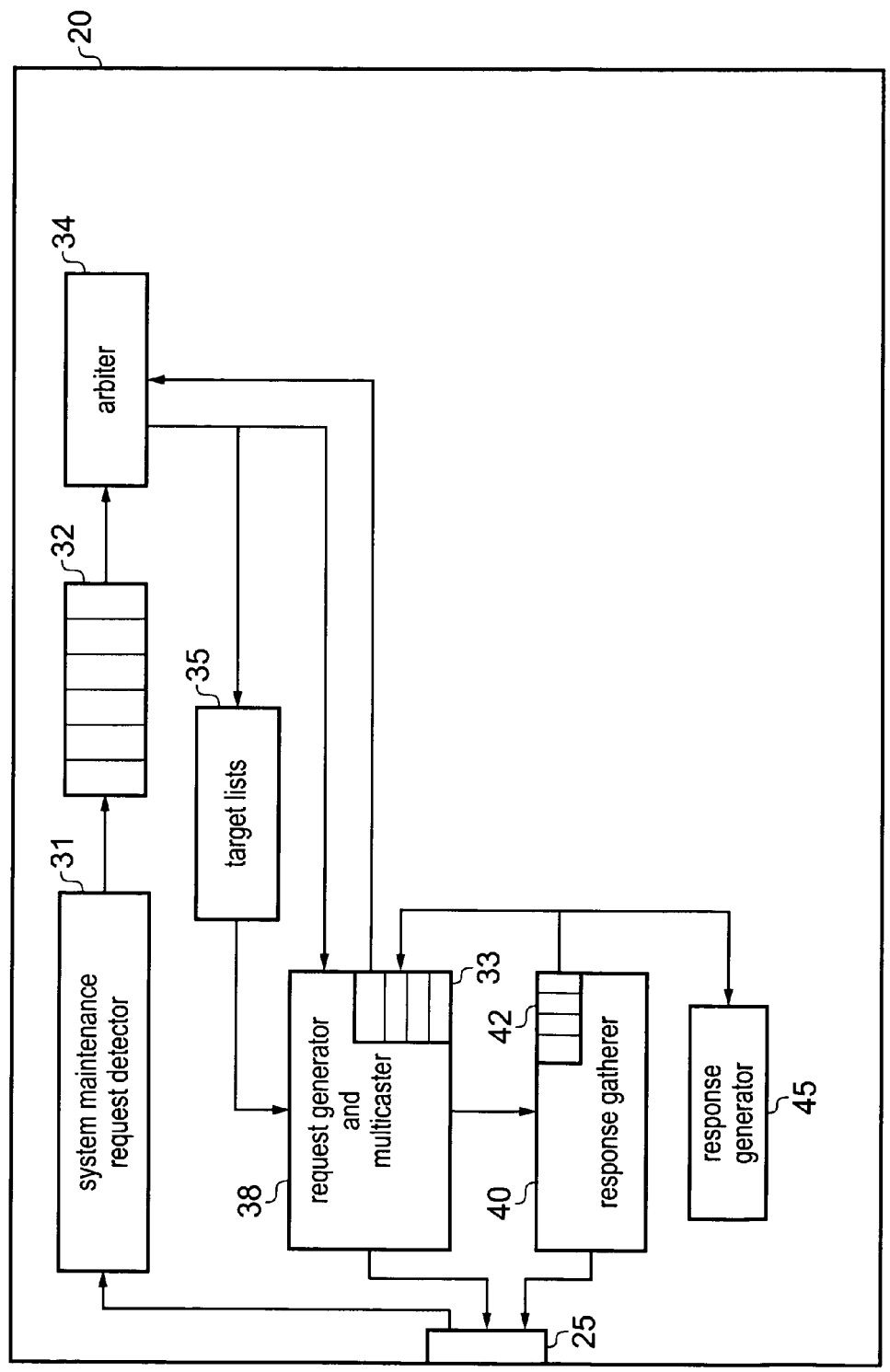
FIG. 10 illustrates a synchronising device that can process system maintenance requests in general according to an embodiment of the present invention.

In some embodiments in addition to receiving and processing system synchronising requests, synchronising device 20 may also process other system maintenance requests, that is requests that are not targeted at memory such as error handling requests, memory maintenance requests and configuration requests. FIG. 10 shows a synchronising device 20 similar to the device of FIG. 2 but configured to receive and arbitrate between further system maintenance requests.

Thus, synchronising device 20 comprises a system maintenance request detector that receives and identifies both system synchronising requests and other system maintenance requests. These are then stored in buffer 32 and arbiter 34 selects one to output to request generator and multicaster 38. Request generator and multicaster 38 can in this embodiment process four system maintenance request at any one time and the four currently being processed are stored in store 33.

In response to receipt of a new system maintenance request for processing by arbiter 34, request generator determines from the target list relevant to this system maintenance request, retrieved from the store 35 of target lists, how many requests need to be generated and where they need to be sent. The counter 42 for that system maintenance request is then updated with that number and response gatherer 40 collects responses to each of the currently active system maintenance requests, identifies which request they are responding to and decrements the appropriate counter. When a counter reaches zero, then a signal is sent to buffer 33, which clears the system maintenance request stored there and outputs a signal to arbiter 34 requesting a new system maintenance request. In this way synchronising device 20 can execute four system synchronising requests at any one time, arbiter 34 determining which should be the next one to be executed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A synchronising device for determining progress of at least a subset of transaction requests that are transmitted through a data processing system in response to receipt of one of a plurality of different types of system synchronising requests, said data processing system having a plurality of devices including a plurality of transaction request generating devices for generating said transaction requests and a plurality of recipient devices for receiving said transaction, requests, said synchronising device and at least one interconnect for interconnecting at least some of said devices;

said system synchronising requests comprising requests generated by one of said plurality of transaction generating devices and querying progress of at least a subset of said transaction requests;

said synchronising device comprising:

at least one port for receiving requests from, and outputting requests and responses to, said data processing system;

system synchronising request identifying circuitry for identifying said type of said system synchronising request received at said at least one port;

buffer circuitry for storing received pending system synchronising requests to be output to multicast circuitry;

arbitration circuitry for selecting a next one of said pending system synchronising requests for output to said multicast circuitry;

said multicast circuitry configured to generate a plurality of synchronising requests in response to receipt of said system synchronising request and to output said plurality of synchronising requests for multicast to at least some of said devices within said data processing system, said synchronising requests querying said progress of said at least subset of said transaction requests at each of said respective at least some of said devices;

gather circuitry for collecting responses to said plurality of synchronising requests said responses confirming said queried progress has occurred at said respective device, said gather circuitry being configured to determine when responses to all of said plurality of synchronising requests generated in response to one of said system synchronising requests have been received and in response to determining that all of said responses have been received to output a response to said one of said system synchronising request.

2. A synchronising device according to claim 1, wherein said arbitration circuitry is configured to select a next one of said pending system synchronising requests for output to said multicast circuitry in dependence upon said type of said system synchronising request and a source of said system synchronising request.

3. A synchronising device according to claim 1, said synchronising device being configured to execute a plurality of system maintenance requests in addition to said system synchronising requests, said arbitration circuitry being configured to select a next one of said system maintenance requests and said system synchronising requests to output to said multicast circuitry.

4. A synchronising device according to claim 1, wherein said system synchronising request requests confirmation that said at least a subset of said transaction requests have completed.

5. A synchronising device according to claim 4, wherein said at least a subset of said transaction requests whose progress is queried by said system synchronising request comprise at least some transaction requests previously output by said transaction request generating device that generated said system synchronising request.

6. A synchronising device according to claim 5, wherein said system synchronising request requests confirmation that said at least a subset of said transaction requests have been received at their destination devices.

7. A synchronising device according to claim 1, said synchronising device comprising a data store for storing at least one target list identifying said at least some devices for multicasting said synchronising requests to.

8. A synchronising device according to claim 7, wherein said data processing system comprises a secure processing domain and a non-secure processing domain, said data store being a secure data store that is not accessible from said non-secure processing domain.

9. A synchronising device according to claim 7, said data store comprising a plurality of target lists, at least one of said target lists corresponding to at least one of said plurality of transaction generating devices, such that in response to receipt of said system synchronising request from one of said plurality of transaction generating devices corresponding to one of said lists said generated synchronising requests are transmitted to said at least some devices in said corresponding target list.

10. A synchronising device according to claim 8, wherein said synchronising device is responsive to receipt of an update signal generated in said secure domain to update at least one of said at least one target list.

11. A synchronising device according to claim 7, said data store being configured to store a plurality of target lists, at least one of said target lists corresponding to at least one of said types of said system synchronising requests and to at least one of said plurality of transaction generating devices, such that in response to receipt of said system synchronising request of said at least one of said type from said at least one of said plurality of transaction generating devices said generated synchronising requests are transmitted to said at least some devices in said corresponding target list.

12. A synchronising device according to claim 1, wherein said system synchronising request comprises at least one of a synchronising barrier transaction request, a memory maintenance synchronise request and a finish and suspend processing request.

13. A synchronising device according to claim 12, wherein in response to said system synchronising request comprising said synchronising barrier transaction request, said multicast circuitry is configured to generate a plurality of barrier transaction requests as said plurality of synchronising requests, said plurality of bather transaction requests requesting confirmation from said at least some devices that any pending transaction requests issued by said transaction generating device that generated said synchronising barrier transaction request have completed, said responses to said plurality of barrier transaction requests indicating that said pending transaction requests have completed.

14. A synchronising device according to claim 12, wherein in response to said system synchronising request comprising said memory maintenance synchronise request, said synchronising requests comprise requests querying progress of a plurality of memory maintenance operation requests issued by said transaction generating device, said responses to said plurality of synchronising requests being indicative that said respective devices have completed said memory maintenance operation requests.

15. A synchronising device according to claim 12, wherein in response to said system synchronising request comprising said local power down request, said multicast circuitry is configured to generate as said plurality of synchronising requests, requests requesting confirmation that said respective device have completed any pending transaction requests.

16. A data processing system comprising:
a plurality of devices including a plurality of transaction request generating devices,
at least one of said transaction request generating devices comprising:
a transaction generator configured to generate a plurality of transaction requests for output to a plurality of devices;
a system synchronising request generator configured to generate a plurality of different types of system synchronising requests querying progress of at least a subset of transaction requests executed by said plurality of devices;
an output port for outputting said system synchronising requests to a synchronising device; wherein said transaction generator is configured not to output any further transaction requests until a response has been received to said system synchronising request from said synchronising device,
at least one recipient device for receiving said transaction requests, and
a synchronising device, said synchronising device comprising:
at least one port for receiving said synchronising request from said transaction request generating device;
system synchronising request identifying circuitry for identifying said type of said system synchronising request received at said at least one port;
buffer circuitry for storing received system synchronising requests to be output to multicast circuitry;
arbitration circuitry for selecting a next one of said pending system synchronising requests for output to said multicast circuitry;
said multicast circuitry configured to generate a plurality of synchronising requests in response to receipt of said system synchronising request and to output said plurality of synchronising requests for multicast to at least some of said devices within said data processing system, said synchronising requests querying said progress of said at least subset of said transaction requests at each of said respective at least some of said devices;
gather circuitry for collecting responses to said plurality of synchronising requests said responses confirming said queried progress has occurred at said respective device, said gather circuitry being configured to determine when responses to all of said plurality of synchronising requests generated in response to one of said system synchronising requests have been received and in response to determining that all of said responses have been received to output a response to said one of said system synchronising request.

17. A method of determining progress of at least a subset of transaction requests that are transmitted through a data processing system, said data processing system having a plurality of devices including a plurality of transaction request generating devices, a plurality of recipient devices for receiving said transaction requests, a synchronising device and at least one interconnect for interconnecting at least some of said devices; said method comprising the steps of:
receiving a plurality of system synchronising requests querying progress of at least a subset of said transaction requests received from one of said plurality of transaction request generating devices, at least some of said system synchronising requests being of different types querying progress of different subsets of transaction requests;
selecting one of said received pending system synchronising requests for output to said multicast circuitry;
receiving said selected pending system synchronising request, generating a plurality of synchronising requests and multicasting said plurality of synchronising requests to at least some of said devices within said data processing system, said synchronising requests querying said progress of said at least subset of said transaction requests at each of said respective devices;
collecting responses to said plurality of synchronising requests;
determining when responses to all of said plurality of synchronising requests generated from one of said system synchronising requests have been received and in response to determining that all of said responses have been received outputting a response to said one of said system synchronising request.

18. A synchronising means for determining the progress of at least a subset of transaction requests that are transmitted through a data processing system in response to receipt of one of a plurality of different types of system synchronising request, said data processing system having a plurality of device means including a plurality of initiator device means for generating transaction requests and a plurality of recipient device means for receiving said transaction requests, said synchronising means and at least one interconnect means for interconnecting at least some of said device means;
said system synchronising request comprising a request generated by one of said plurality of transaction generating devices and querying progress of said at least a subset of said transaction requests;
said synchronising means comprising:
at least one port means for receiving requests from, and outputting requests and responses to, said data processing system;
system synchronising request identifying means for identifying said type of said system synchronising request received at said at least one port;
buffer means for storing received pending system synchronising requests to be output to multicast circuitry;
arbitration means for selecting a next one of said pending system synchronising requests for output to said multicast circuitry;
multicast means for generating a plurality of synchronising requests in response to receipt of said system synchronising request and for outputting said plurality of synchronising requests to multicast to at least some of said device means within said data processing system, said synchronising requests querying said progress of said at least subset of said transaction requests at each of said respective device means;
gather means for collecting responses to said plurality of synchronising requests, said responses confirming said queried progress has occurred at said respective device means, said gather means being for determining when responses to all of said plurality of synchronising requests generated in response to one of system synchronising requests have been received and for outputting a response to said one of said system synchronising request in response to determining that all of said responses have been received.

* * * * *